(No Model.) 2 Sheets—Sheet 1.
J. W. TERMAN.
PORTABLE CORN THRASHER AND SEPARATOR.
No. 397,879. Patented Feb. 12, 1889.
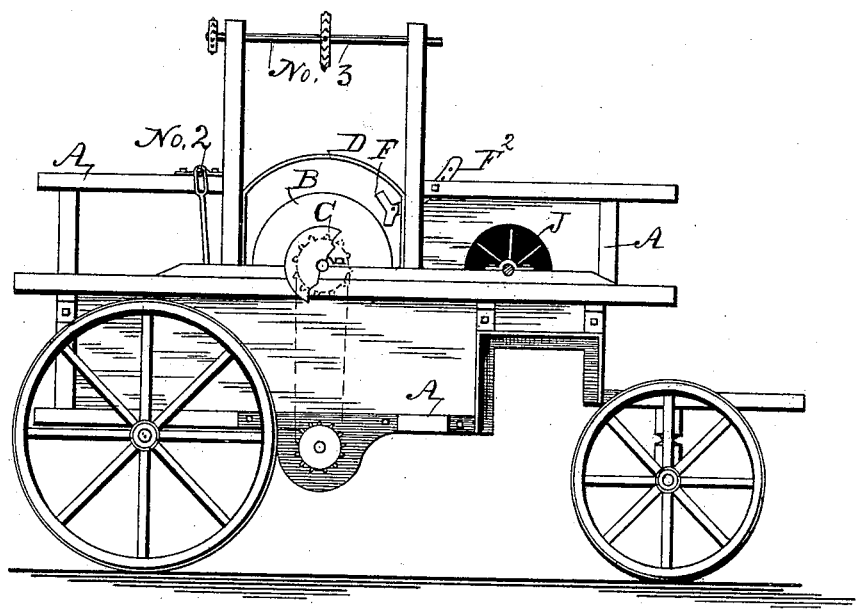
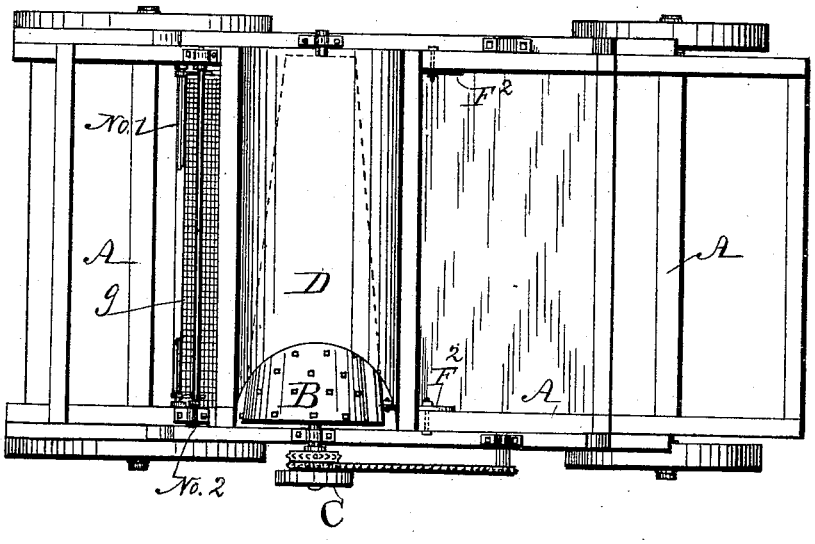

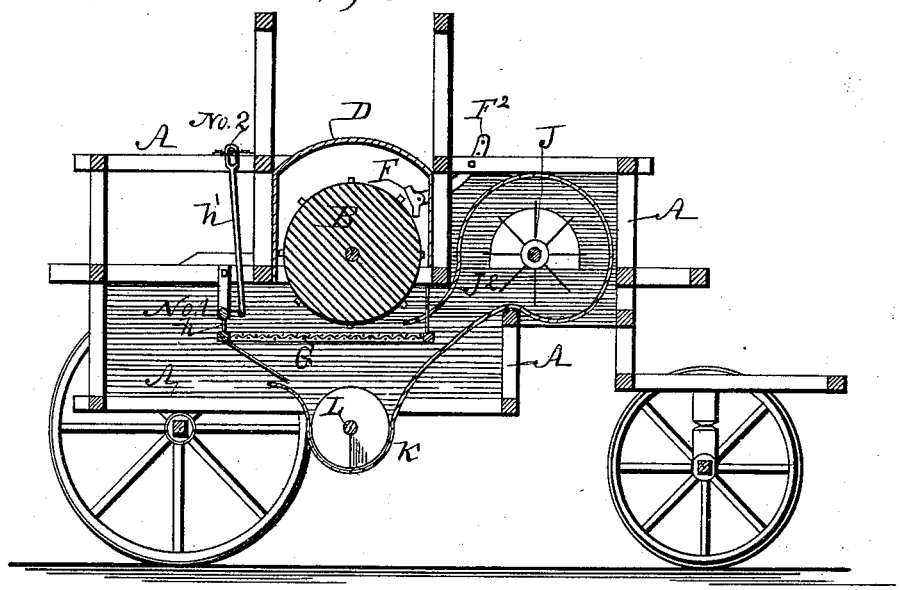
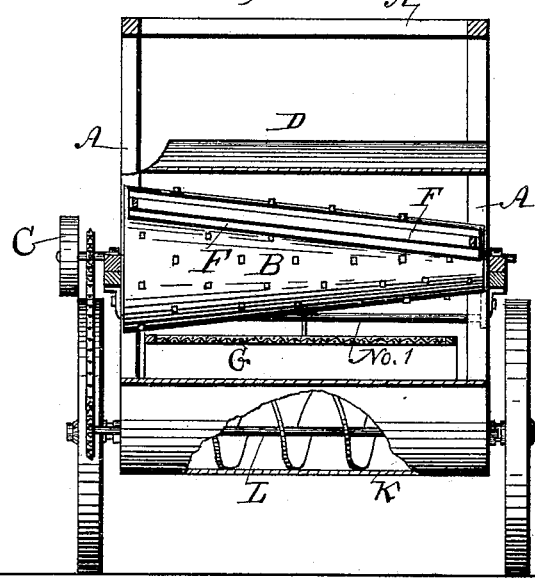

UNITED STATES PATENT OFFICE.

JAMES W. TERMAN, OF NEW SHARON, ASSIGNOR TO DEERE, WELLS & CO., OF COUNCIL BLUFFS, IOWA.

PORTABLE CORN THRASHER AND SEPARATOR.

SPECIFICATION forming part of Letters Patent No. 397,879, dated February 12, 1889.

Application filed March 1, 1888. Serial No. 265,884. (No model.)

*To all whom it may concern:*

Be it known that I, JAMES W. TERMAN, a citizen of the United States of America, and a resident of New Sharon, in the county of Mahaska and State of Iowa, have invented an Improved Portable Corn Thrasher and Separator, of which the following is a specification.

My invention consists in the construction and combination of a tapering cylinder, an adjustable concave, a vibrating screen, a fan-case and rotary fan, and a conveyer with a tractable carriage having openings in the side walls of its body, as hereinafter set forth, pointed out in my claim, and illustrated in the accompanying drawings, in which—

Figure 1 is a side view; Fig. 2, a top view from which parts are broken away; Fig. 3, a vertical and longitudinal sectional view; and Fig. 4 is a transverse vertical sectional view taken through a line in rear of the cylinder and conveyer.

A represents a carriage-frame, made of wood and iron and adapted in form and construction for supporting the operative mechanism. Wood or sheet metal is fixed to the sides of the frame to produce tight walls, and at the ends of the cylinder openings are formed in these walls, as required, so that in operating the cylinder the corn and fodder will be delivered at the side of the machine, while the dirt and dust will be blown out at the end by the fan.

B is a cylinder mounted in bearings fixed to the opposite sides of the central portion of the frame A in such a manner that it will extend horizontally. It is preferably about four (4) feet long, sixteen (16) inches in diameter at one end and nine (9) inches at the other end. Rows of teeth project from its surface, and the rows are preferably spiral and more numerous at the larger portion than at the smaller. It is operated by means of a drive-wheel, C, fixed on its end and connected with a horse-power or other suitable motor in a common way.

D is a cover fixed to the frame A, to extend over the cylinder and concave in such a manner that it will, in combination with the cylinder and concave, produce a chute through which the corn stalks and husks will be forced laterally relative to the complete machine and discharged at the side of the machine through an opening toward which the said concave slopes.

F is a metal concave connected with the frame A in such a manner that its lower edge will extend parallel with the toothed periphery of the tapering cylinder B. The concave has integral projections at its rear side and opposite ends, to which segments $F^2$ are fixed in such a manner that they can be adjustably connected with the frame A, and the ends of the concave thereby independently adjusted relative to the cylinder, as required, to facilitate the work contemplated and to adapt the machine for the different conditions of corn that is to be shelled thereby. By thus arranging and combining a concave with a tapering cylinder it will incline toward one side of the machine, serve as a guard to prevent coarse matter from getting under the cylinder, and also serve as a chute or inclined plane for carrying off the coarse matter.

G is a screen so constructed and suspended relative to the cylinder B and a fan that the corn and small particles of cobs and fodder will fall thereon, to be separated thereby.

4 is a rock-shaft in bearings fixed to the frame A and extending parallel with the cylinder B. It is connected with the suspended screen G, by means of short arms $h$, in such a manner that a vibratory motion will be imparted to the screen by means of the rock-shaft.

2 is a rotating shaft in parallel position with the shaft 1 and connected therewith by means of a rod, $h'$, that has a bridle at its end to engage an eccentric on the shaft in such a manner that a rock motion will be imparted to the shaft 1 by the continuous rotary motion of the shaft 2, as required, to shake the screen. The shaft 2 is connected with the driving mechanism by means of a chain and chain-wheels, or in any suitable way.

J is a rotary fan in parallel position with the cylinder and connected therewith by means of drive-wheels and a chain.

$J^2$ is a fan-case fixed to the frame A in such a manner that its top will extend under the cylinder and serve as an inclined plane to direct the falling corn upon the vibrating screen, and its lower edge connects with a conveyer, so as to allow wind from the fan to pass over and also under the suspended vibrating screen. The wall of the fan-case is preferably made of sheet metal.

K is a conveyer-case, made of sheet metal and fixed to the frame A immediately under the screen and cylinder.

L is a conveyer-shaft, provided with a spiral flange in a common way and connected with the cylinder-shaft in such a manner that it will be operated thereby, as required, to convey the corn from one end of the case to the other, so that it can drop into a bag or other receptacle, or be elevated by automatic mechanism into a wagon, car, or wherever desired.

3 is a shaft designed to be connected with the driving-shaft in such a manner that it can be utilized to operate feeding mechanism combined with the large end of the cylinder.

From the foregoing description of the construction and function of each element the unitary actions of all the parts and the practical operation of the complete machine will be readily understood by persons familiar with corn-shellers.

I am aware that cylinders, concaves, and conveyers have been combined in corn-shellers to convey the corn and cobs longitudinally relative to the machine; but my manner of arranging and combining a tapering cylinder, a concave, a screen, a fan, and a conveyer so that by their joint action the husks and stalks and cobs will be kept from the screen and the cobs and stalks conveyed laterally with the husks to be utilized as prepared feed, and the corn shelled from the cobs also conveyed laterally relative to the machine, while the dirt is discharged at the end of the machine, is new and greatly advantageous in preparing a corn crop for market and in handling and utilizing the cobs and husks and stalks for feed.

I claim as my invention—

A carriage-frame having fixed sides and openings in the sides, a tapering toothed cylinder connected with said frame and the openings in said sides, an adjustable concave, and a fixed cover, arranged and combined to operate in the manner set forth, for the purposes stated.

JAMES W. TERMAN.

Witnesses:
E. H. SHEAFE,
S. D. WADSWORTH.